United States Patent
Herman et al.

(10) Patent No.: US 11,699,206 B2
(45) Date of Patent: Jul. 11, 2023

(54) AUGMENTED REALITY VEHICLE IDENTIFICATION WITH VISUAL LIGHT COMMUNICATION

(71) Applicant: Ford Global Technologies, LLC, Dearborn, MI (US)

(72) Inventors: David Michael Herman, Oak Park, MI (US); Nicholas Scheufler, Flat Rock, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 327 days.

(21) Appl. No.: 16/786,849

(22) Filed: Feb. 10, 2020

(65) Prior Publication Data
US 2021/0250178 A1 Aug. 12, 2021

(51) Int. Cl.
*H04W 12/06* (2021.01)
*H04L 9/32* (2006.01)
(Continued)

(52) U.S. Cl.
CPC ........... *H04L 9/3247* (2013.01); *G06Q 50/30* (2013.01); *G06T 11/00* (2013.01); *H04B 10/116* (2013.01);
(Continued)

(58) Field of Classification Search
CPC ........... H04L 63/0876; H04L 2209/84; H04W 12/06; B60Q 5/00
See application file for complete search history.

(56) References Cited

U.S. PATENT DOCUMENTS 10,193,627 B1 * 1/2019 Herman ............... H04B 10/116
10,696,222 B1 * 6/2020 Pandit ..................... B60Q 1/26
(Continued)

FOREIGN PATENT DOCUMENTS

WO WO-2017125747 A1 * 7/2017

OTHER PUBLICATIONS

Avula et al. Improving Rider Safety Using QR Code & Fingerprint Biometrics Oct. 10-12, 2019 2019 IEEE 10th Annual Ubiquitous Computing, Electronics & Mobile Communication Conference (UEMCON) (Year: 2019).*
(Continued)

*Primary Examiner* — David J Pearson
(74) *Attorney, Agent, or Firm* — Brandon Hicks; Eversheds Sutherland (US) LLP

(57) ABSTRACT

The disclosure relates to augmented reality vehicle identification with visual light communication. For example, a mobile device may be configured for "scanning" an area having multiple parked vehicles within visual range of the mobile device, to identify a target vehicle. The mobile device may include an application for identifying the target vehicle using visual light communication (VLC) equipment and techniques that present an augmented reality outline or other identification of the target vehicle on the smartphone screen once the vehicle is identified by the system. The encrypted communication channels with the vehicle may be established to utilize vehicle headlamps, interior lights, or another light emitting device to establish the VLC between the user's phone and the vehicle VLC system. The mobile device may emit VLC signals using an onboard light emitter while being in visual communication with the target vehicle, establish an encrypted communication channel with the vehicle, and identify the vehicle using automatic and/or user-selectable identification features.

20 Claims, 6 Drawing Sheets

(51) Int. Cl.
  *H04L 9/30*     (2006.01)
  *G06Q 50/30*    (2012.01)
  *H04B 10/116*   (2013.01)
  *G06T 11/00*    (2006.01)
  *H04N 21/44*    (2011.01)
  *H04L 9/40*     (2022.01)
  *B60Q 1/50*     (2006.01)
  *B60Q 5/00*     (2006.01)
  *B60Q 1/48*     (2006.01)

(52) U.S. Cl.
  CPC .............. *H04L 9/3073* (2013.01); *H04L 9/32* (2013.01); *H04L 63/0876* (2013.01); *H04N 21/44008* (2013.01); *H04W 12/06* (2013.01); *B60Q 1/482* (2013.01); *B60Q 1/50* (2013.01); *B60Q 5/00* (2013.01); *G06Q 2220/00* (2013.01); *H04L 2209/84* (2013.01)

(56) References Cited

U.S. PATENT DOCUMENTS

| | | | |
|---|---|---|---|
| 2017/0115125 A1* | 4/2017 | Outwater | H04W 12/069 |
| 2017/0346559 A1* | 11/2017 | Eroglu | H04B 10/07953 |
| 2018/0041377 A1* | 2/2018 | Feltham | H04L 45/22 |
| 2018/0075287 A1* | 3/2018 | Elswick | H04B 10/1123 |
| 2018/0205457 A1* | 7/2018 | Scheim | H04B 10/40 |
| 2018/0205502 A1* | 7/2018 | Merlin | H04B 1/1615 |
| 2018/0234181 A1* | 8/2018 | Nyarko | G01S 1/7034 |
| 2018/0292916 A1* | 10/2018 | Donnelly | B60Q 1/2611 |
| 2018/0309928 A1* | 10/2018 | Kadambala | H04N 5/23241 |
| 2018/0349699 A1* | 12/2018 | O'Connell | G01C 21/3438 |
| 2019/0020412 A1* | 1/2019 | Bitra | H04B 10/116 |
| 2019/0206258 A1 | 7/2019 | Chang et al. | |
| 2020/0160054 A1* | 5/2020 | Rogan | H04W 4/44 |
| 2020/0223395 A1* | 7/2020 | Zhang | B60R 25/2018 |
| 2020/0223396 A1* | 7/2020 | Yi | B60R 25/252 |

OTHER PUBLICATIONS

Malcolm Owen, Apple Insider, "Apple Looking at Augmented Reality to Help Ride-Sharing App Customers Find Their Drivers", Dec. 6, 2018.

Peter Ondruska et al., AR Content and Cloud Anchors, "Blue Vision", 4 pages, 2018.

* cited by examiner

AUGMENTED REALITY VEHICLE IDENTIFICATION WITH VISUAL LIGHT COMMUNICATION

TECHNICAL FIELD

The present disclosure relates to vehicle communication systems, and more particularly, to vehicle light communication systems with augmented reality user interfaces.

BACKGROUND

A passenger may enter the wrong ride sharing vehicle or a vehicle may not be able to correctly identify a designated passenger in a group of individuals. Worse, a passenger may enter the incorrect vehicle which may result in confusion and personal safety concerns for both riders and vehicle occupants. Conventional methods for identifying passengers in a crowd or identifying a particular vehicle in a crowd of vehicles are not accurate enough to provide correct vehicle/customer identification. Stickers or lights may not provide correct vehicle and driver identification and may be confused by riders or faked by bad actors. Some existing vehicle and driver identification systems may integrate mobile device technology for identifying a vehicle driver to a rider in a crowd. However, conventional systems may not allow an autonomous vehicle or human driver to identify a particular rider amongst a crowd due to deficiencies in localization resolution or insufficient accuracy in object recognition and classification. Furthermore, the correct vehicle and/or passenger may be occluded from one another thus affecting the accuracy of localization and object detection methods.

Conventional systems may not use standard vehicle equipment, such as vehicle headlights, to perform aspects of the visual light communication, and may not exchange information needed to establish secure channels between the mobile device and the vehicle controllers, such as an exchange of cryptographic keys. Rider identity and vehicle identity may become increasingly important to personal safety and convenience, as will the relative security of the communication channels that provide such information.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
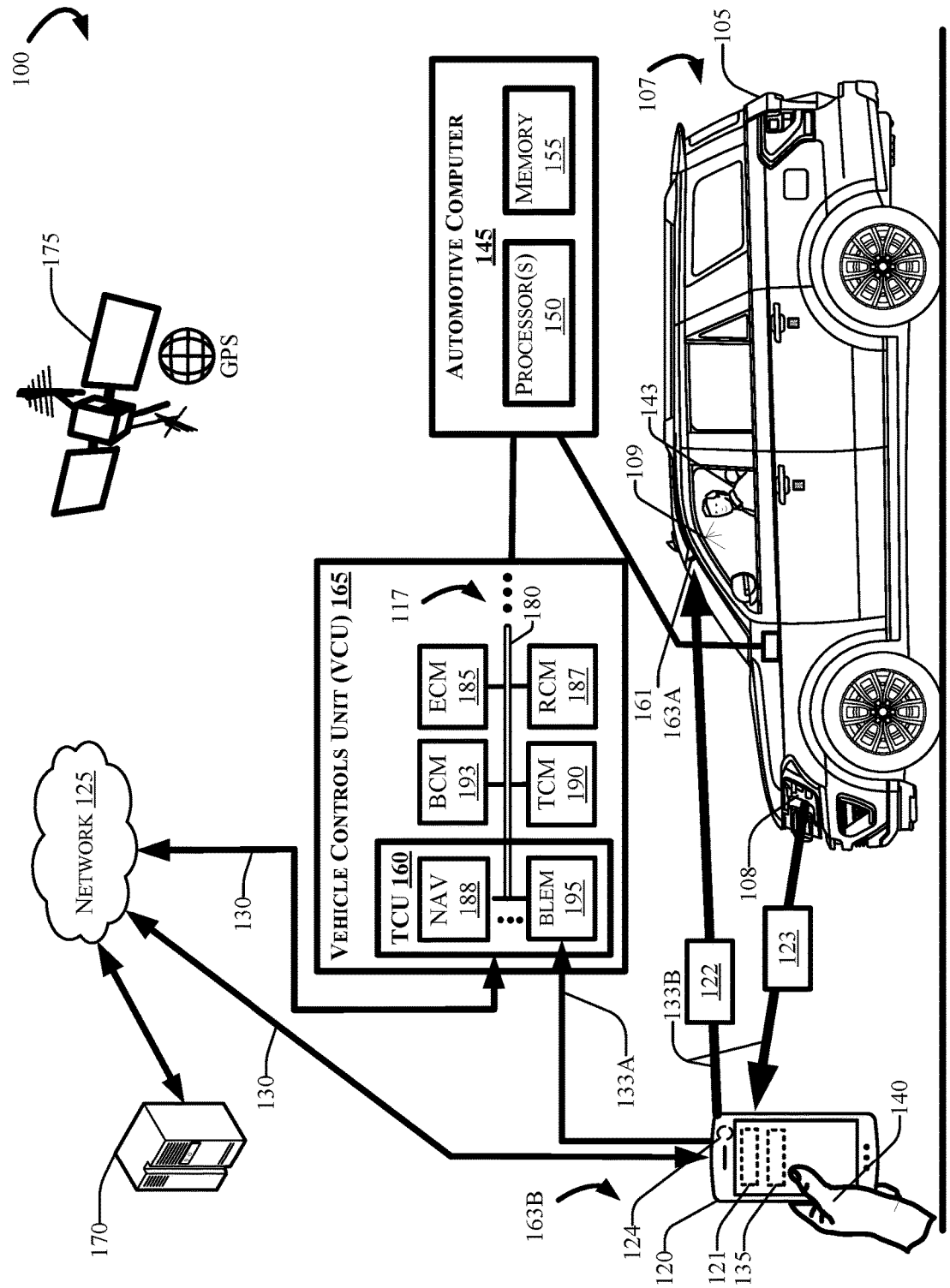
FIG. 1 depicts an example computing environment in which techniques and structures for providing the systems and methods disclosed herein may be implemented.

The systems and methods disclosed herein are configured for improved methods and systems that identify a ridehail vehicle to a user. The method may include a mobile device configured for "scanning" the area, where the mobile device includes an application for presenting an augmented reality outline, haptic feedback, or other identification of a target vehicle on the smartphone screen. The disclosed system and method may utilize vehicle headlamps, interior lights, a mobile device used inside the vehicle, or another light emitting device for establishing visual light communication between the ridehail user's phone outside of the vehicle and the vehicle visual light communication system. Visible light communications (VLC) works by switching current to Light Emitting Diodes (LEDs) or other light emitters off and on at a very high speed (e.g., 100 Hertz or more), which is not noticeable by the human eye. Accordingly, VLC does not present any flickering to an observer. In one aspect, the mobile device may emit visual light signals using an onboard LED camera light, an infrared light emitter, or another visual light communication equipment while being in visual communication with the target vehicle that also includes VLC communication receivers and emitters, establish an encrypted communication channel with the vehicle, and identify the vehicle to the mobile device using automatic and/or user-selectable identification features. Receivers may include photodiodes, CMOS cameras, and other light sensitive sensors capable of distinguishing temporal and/or spatial properties of light emission.

In some embodiments, the present disclosure includes a system having a mobile device that includes a processor and a memory storing instructions. The memory stores instructions that, when executed, can cause the processor, when executed, to connect a mobile device application with a ridehailing application server, and send a vehicle identification (ID) request message to the vehicle computing system. The vehicle ID request message can include a cryptographic mobile device key of a cryptographic key pair, and a request to establish a visual light connection (VLC) between the vehicle and the mobile device. In other aspects, the vehicle ID request message may further include other information, such as, for example, an approximate device location based on GPS, configuration information that describes VLC parameters given features of the respective cameras, light emitter capabilities, ambient illumination, etc. The processor identifies the vehicle, in response to the vehicle ID request message, and via a VLC system onboard the vehicle, the vehicle via a vehicle ID and a cryptographic vehicle key of the cryptographic key pair.

Conventional methods for identifying vehicles and drivers to mobile device users may use techniques such as Global Positioning System (GPS), which may not be accurate enough to provide correct vehicle/customer identification. Furthermore, use of stickers or lights due not provide the task of correct identification and may easily be confused or faked using conventional methods. Also, present solutions do not allow the autonomous vehicle or driver to identify a customer amongst a crowd in the general location identified by the GPS. Prior solutions may require storage of biometric information which may pose privacy implications or be inadequate under a number of circumstances to enable correct identification.

These and other advantages of the present disclosure are provided in greater detail herein.

Illustrative Embodiments

The disclosure will be described more fully hereinafter with reference to the accompanying drawings, in which exemplary embodiments of the disclosure are shown, and not intended to be limiting.

FIG. 1 depicts an example computing environment 100 that can include one or more vehicle(s) 105 comprising an automotive computer 145, and a Vehicle Controls Unit (VCU) 165 that typically includes a plurality of electronic control units (ECUs) 117 disposed in communication with the automotive computer 145 and a visual light communication (VLC) system 107. A mobile device 120, which may be associated with a ridehail passenger 140 and the vehicle 105, may connect with the automotive computer 145 using wired and/or wireless communication protocols and transceivers, and visual light communication. The mobile device 120 may be communicatively coupled with the vehicle 105 via one or more network(s) 125, which may communicate via one or more wireless channel(s) 130, and/or may connect with the vehicle 105 directly using near field communication (NFC) protocols, Bluetooth® protocols, Wi-Fi, Ultra-Wide Band (UWB), and other possible data connection and sharing techniques. The vehicle 105 may also receive and/or be in communication with a Global Positioning System (GPS) 175.

The automotive computer 145 may be or include an electronic vehicle controller, having one or more processor(s) 150 and memory 155. The automotive computer 145 may, in some example embodiments, be disposed in communication with the mobile device 120, and one or more ridehail application server(s) 170. The ridehail application server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a sport utility, the vehicle 105 may take the form of another passenger or commercial automobile such as, for example, a car, a truck, a crossover vehicle, a van, a minivan, a taxi, a bus, a rickshaw, a jeepney, etc., and may be configured and/or programmed to include various types of automotive drive systems. Exemplary drive systems can include internal combustion engine (ICE) powertrains having a gasoline, diesel, or natural gas-powered combustion engine with conventional drive components such as, a transmission, a drive shaft, a differential, etc. In another configuration, the vehicle 105 may be configured as an electric vehicle (EV). More particularly, the vehicle 105 may include a battery EV (BEV) drive system, or be configured as a hybrid EV (HEV) having an independent onboard powerplant, a plug-in HEV (PHEV) that includes an HEV powertrain connectable to an external power source, and including a parallel or series hybrid powertrain having a combustion engine powerplant and one or more EV drive systems. HEVs can include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured and/or programmed to operate in a fully autonomous (e.g., driverless) mode (e.g., level-5 autonomy) or in one or more partial autonomy modes. Examples of partial autonomy modes are widely understood in the art as autonomy Levels 0 through 5. An autonomous vehicle (AV) having Level 1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

According an embodiment, the VLC system 107 may be configured and/or programmed to operate with a vehicle having any level of autonomous control using an AV controller (not shown in FIG. 1). For example, the vehicle 105 may operate in Level-3, Level-4, or Level-5 AV mode such that the ridehail passenger 140 may not have a human contact (e.g., a vehicle driver) with whom they can verify vehicle identity. In another aspect, the vehicle 105 may have a vehicle driver 143 onboard the vehicle 105. The mobile device 120, and more particularly, the application 135, may connect with a ridehailing application server such as the ridehail application server(s) 170 as shown in FIG. 1, and/or connect with a vehicle computing system such as the VCU 165.

By way of a general overview, the VLC system 107 can include components onboard the vehicle 105 and offboard the vehicle 105 such that the mobile device 120 may establish a visual light communication (VLC) with the vehicle (and vice versa). Although described as an encrypted communication channel, the VLC may also, in an embodiment, establish a non-encrypted communication channel. The mobile device 120 may send information to the vehicle 105 to establish a secured and/or unsecured communication channel with the vehicle 105. For example, the mobile device 120 may send a vehicle identification (ID) request message 122 to the VCU 165, where the vehicle ID request message 122 includes cryptographic mobile device key (not shown in FIG. 1). The cryptographic mobile device key may be one key of a cryptographic key pair that is unique to the vehicle 105 and the mobile device 120. Accordingly, the mobile device 120 may transmit the vehicle ID request message as a request to establish a visual light connection (VLC) between the vehicle 105 and the mobile device 120. The mobile device processor 121 may identify the vehicle via the VLC system 107 onboard the vehicle 105, using a vehicle ID and a cryptographic vehicle key (collectively shown in FIG. 1 as a response message 123), that may be sent back to the mobile device 120 as a response to the vehicle ID request message 122.

In one embodiment, the mobile device 120 may not have a clear line of sight to the vehicle 105 due to an obstruction. A second vehicle (not shown in FIG. 1) may be configured with a second VLC system (not shown in FIG. 1), and may also be disposed in communication with one or more of the mobile device 120 and/or the vehicle 105. Accordingly, the second vehicle may receive the vehicle ID request message and forward the message to the vehicle 105 to establish the VLC between the vehicle 105 and the mobile device 120. For example, the obstruction between the mobile device 120 and the vehicle 105 may be a temporary or intermittent obstruction such as another vehicle (not shown in FIG. 1) that stops briefly between the mobile device 120 and the vehicle 105, then leaves the scene (a temporary obstruction), or an intermittent obstruction such as tree or other object that blocks the signal as the wind changes its position. By using a third vehicle relay, the mobile device 120 may establish communication with the vehicle 105 in a timely fashion despite the temporary or intermittent obstruction.

In another aspect, the mobile device 120 may not have a clear line of sight to the vehicle 105 due to the obstruction, but may still form a VLC communication channel using an infrared (IR) LED source (IR-LED) and an IR receiver disposed in communication with the vehicle having the same equipment. Accordingly, without the aid of the second vehicle, the mobile device 120 and the vehicle 105 may establish a secured or unsecured communication channel using the IR VLC system.

The VLC system 107 may be configured and/or programmed to cause the VCU 165 to connect to a ridehailing application server, such as the ridehail application server(s) 170, receive a mobile device identification (ID) request message that includes a cryptographic mobile device key. The mobile device key may be, in an example embodiment, part of a cryptographic key pair. The ID request message can also include a request to establish a visual light connection (VLC) between the vehicle 105 and the mobile device 120 using various aspects of VCU 165 controlled components. The controlled components may include, for example, a camera system 163a and/or 163b, the vehicle headlamps 108, interior light emitter(s) 109, a vehicle horn (not shown in FIG. 1, etc.). The VCU 165 may communicate with the mobile device via the network(s) 125, and/or via one or more wireless channel(s) 133 that connect the mobile device 120 with the VCU 165 directly using the VLC.

The mobile device 120 can include a memory for storing program instructions associated with an application 135 that, when executed by a mobile device processor 121, performs aspects of disclosed embodiments. The application (or "app") 135 may be part of the VLC system 107, or may provide information to the VLC system 107 and/or receive information from the VLC system 107. The mobile device 120 may further include a camera system 163B, which may be substantially similar or identical to the camera system 163A installed onboard the vehicle 105. The VLC system 107 may further include photodiode configured with an inertial measurement unit (IMU) for mobile device location and VLC information exchange. In another aspect, camera system 163A may be and/or include a second mobile device (not shown) configured and/or programmed to communicate with and/or otherwise integrate with the vehicle 105, the VCU 165, and/or other aspects of the vehicle 105. For example, a user inside the vehicle may perform some VLC communication aspects using their mobile device when the device is configured as part of the VLC system 107.

In one example embodiment, the camera system(s) 163A and/or 163B may be a high dynamic range (HDR) image camera system, and/or may include a Time-of-Flight (TOF) range image camera system on both vehicle 105 and the mobile device 120. The camera system 163A and 163B may be used additionally or exclusively to exchange information.

In some aspects, the mobile device 120 may communicate with the vehicle 105 through the one or more channel(s) 130, which may be encrypted and established between the mobile device 120 and a Telematics Control Unit (TCU) 160. The mobile device 120 may communicate with the TCU 160 using a wireless transmitter associated with the TCU 160 on the vehicle 105. The transmitter may communicate with the mobile device 120 using a wireless communication network such as, for example, the network(s) 125. The wireless channel(s) are depicted in FIG. 1 as communicating via the one or more network(s) 125 through channel(s) 130, and also via direct communication with the vehicle 105 through channel(s) 133A using Bluetooth communication, and/or via the channel(s) 133B using VLC.

The network(s) 125 illustrate an example of an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the VLC system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a VLC channel establishing and communication program code. The memory 155 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may coordinate the data between vehicle 105 systems, connected servers (e.g., the ridehail application server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Restraint Control Module (RCM) 187, etc. In some aspects, the VCU 165 may control aspects of the vehicle 105, and implement one or more instruction sets received from the application 135 operating on the mobile device 120, from instructions received from an autonomous vehicle (AV) controller such as an AV controller 245 discussed with respect to FIG. 2.

The TCU 160 can be configured and/or programmed to provide vehicle connectivity to wireless computing systems onboard and offboard the vehicle 105, and may include a Navigation (NAV) receiver 188 for receiving and processing a GPS signal from the GPS 175, a Bluetooth® Low-Energy Module (BLEM) 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may be disposed in communication with the ECUs 117 by way of a Controller Area Network (CAN) bus 180. In some aspects, the TCU 160 may retrieve data and send data as a CAN bus 180 node.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120.

The CAN bus 180 may be configured as a multi-master serial bus standard for connecting two or more of the ECUs 117 as nodes using a message-based protocol that can be configured and/or programmed to allow the ECUs 117 to communicate with each other. The CAN bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the VLC system 107, and/or the ridehail application server(s) 170, etc.), and may also communicate with one another without the necessity of a host computer. The CAN bus 180 may connect the ECUs 117 with the automotive computer 145 such that the automotive computer 145 may retrieve information from, send information to, and otherwise interact with the ECUs 117 to perform steps described according to embodiments of the present disclosure. The CAN bus 180 may connect CAN bus nodes (e.g., the ECUs 117) to each other through a two-wire bus, which may be a twisted pair having a nominal characteristic impedance. The CAN bus 180 may also be accomplished using other communication protocol solutions, such as Media Oriented Systems Transport (MOST) or Ethernet. In other aspects, the CAN bus 180 may be a wireless intra-vehicle CAN bus.

The VCU 165 may control various loads directly via the CAN bus 180 communication or implement such control in conjunction with the BCM 193. The ECUs 117 described with respect to the VCU 165 are provided for exemplary purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the VLC system 107, and/or via wireless signal inputs received via the wireless channel(s) 133 from other connected devices such as the mobile device 120, among others. The ECUs 117, when configured as nodes in the CAN bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is contemplated and that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, Autonomous Vehicle (AV) control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality. In one aspect, a vehicle having a trailer control system may integrate the system using, at least in part, the BCM 193.

The computing system architecture of the automotive computer 145, VCU 165, and/or the VLC system 107 may omit certain computing modules. It should be readily understood that the computing environment depicted in FIG. 1 is one example of a possible implementation according to the present disclosure, and thus, it should not be considered limiting or exclusive.

The VLC system 107 may include the HDR image camera system 163, which may be configured and/or programmed to obtain an HDR image to identify and communicate with configured devices by analyzing image frames of a scene where one or more other devices, vehicles, etc., are within the image frames and have a line of sight with the camera system 163. The camera system 163 may include components for identifying the vehicle 105 to the application 135 instantiated on the mobile device 120, and may further include components instantiated onboard the vehicle 105 for identifying the mobile device 120. Accordingly, the camera system 163 is referred to as 163A when referenced onboard the vehicle 105, and 163B when referenced as being part of the mobile device 120. Although described with respect to an HDR image system onboard a mobile device or onboard a vehicle, it should be appreciated that the HDR systems for each respective device may function in a substantially similar or identical fashion.

One such HDR image camera system is described in U.S. Pat. No. 10,193,627 assigned to Ford Global Technologies, LLC and issued Jan. 29, 2019, which is incorporated herein by reference in its entirety. By way of a brief overview of the underlying technology incorporated herein, the VLC system 107 may obtain the HDR image, which may be based from a series of image frames captured at varying exposure durations using one or more cameras (e.g., the camera(s) 124). In one example embodiment, the VLC system 107 may fuse the images into a single composited dynamic range image (not shown in FIG. 1) by sequencing of one or more HDR images and/or the captured image frames (e.g., in time-sequence), and searching the sequenced frames for evidence of light sources based on their having a temporal variation (image to image capture) and/or a spatial variation (e.g., due to the artifacts of a CMOS camera rolling shutter).

One type of light source contemplated for use with systems of the present disclosure may include Light Fidelity (LiFi) technology. LiFi is wireless communication technology that utilizes light to transmit data and position information between two digital devices. More particularly, LiFi is a derivative of optical wireless communications (OWC) technology, which uses light from light-emitting diodes (LEDs) as a medium to deliver network, mobile, high-speed communication in a similar manner to Wi-Fi. The data transmission may be made at high speeds over the visible light, ultraviolet, and infrared spectrums. In its present state, only LED lamps can be used for the transmission of visible light.

In an example embodiment, the VLC system 107 may detect a compatible device (either onboard a vehicle or onboard a mobile device) using LiFi detecting algorithms that search image captures after dividing the image frames into sub-windows that provide searchable data in real-time or substantially real-time video feeds. In addition to detecting the locations of VLC sources (i.e., their sub-window "footprint" in the image frame), the VLC system 107 may also use an HDR image to determine an optimal exposure duration for each respective VLC source. For example, an average or median value (e.g., brightness) of the pixels within the sub-window (i.e., a bounding box) containing an individual source (e.g., an LED array) is used to calculate a respective optimal exposure. Alternatively, one or more processor(s) (e.g., the processor(s) 150 and/or 121) may view the identified VLC sources separately in individual field of view (FOV) sub-windows to avoid disadvantages of using a global exposure time, which may prevent data transmission from low intensity LED sources altogether or may lower the data transmission rates obtained with higher brightness LED sources.

In one aspect, a visible light communication (VLC) method can include capturing frames of a scene with a camera. The processor 121 may assemble an enhanced dynamic range image sequence from the frames of the scene to determine whether at least one VLC source may be detected in the frames. More particularly, the VLC system 107 may determine whether at least one VLC source is identified in in the enhanced sequence of a respective sub-window of consecutive image frames obtained by the system. An exposure at the sub-window is optimized according to a brightness of the respective VLC source. The VLC system 107 may capture a plurality of sub-windows images of a scene using the optimized exposure. The processor 121 may then decode the VLC data visible in the sub-window images. As used herein, brightness refers to any particular modulation in intensity (with or without changes in color) using any known encoding scheme for VLC.

Figure 2:
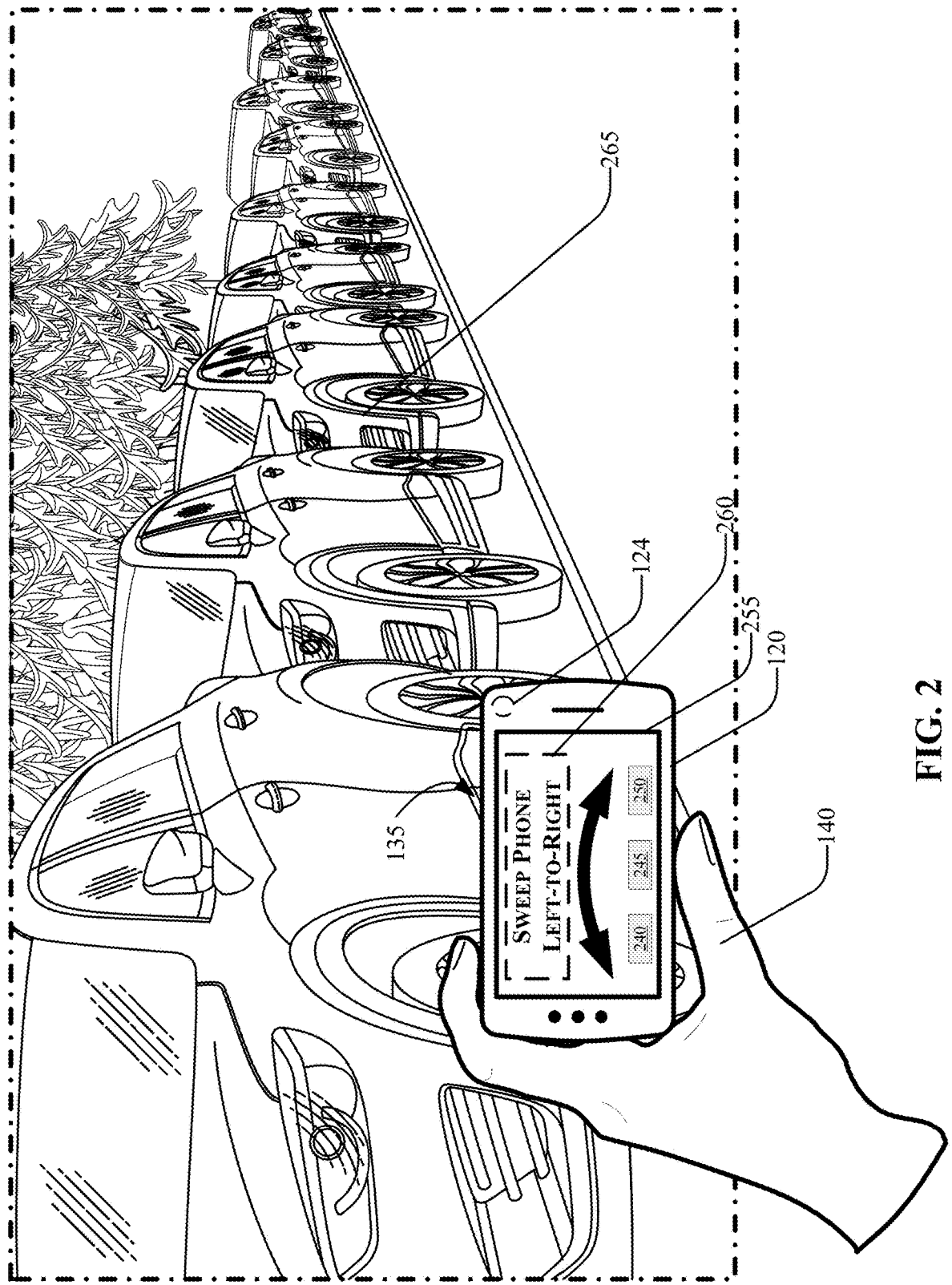
FIGS. 2-5 depict a street scene of a plurality of vehicles parked in a row, as viewed through the mobile device display in accordance with the present disclosure.

FIG. 2 depicts a street scene of a plurality of vehicles parked in a row. In one example scenario, the vehicles of FIG. 2 may be at an airport or other public transportation hub where passengers, such as the ridehail passenger 140, may meet ridehail drivers and/or vehicles. In one aspect, the vehicles of FIG. 2 include a target vehicle 265. As explained herein, the ridehail passenger 140 may not be clear as to which of the vehicles is the target vehicle 265. The application 135 operative on the mobile device 120 may be used by the ridehail passenger 140 to identify the target vehicle 265.

In one example embodiment, the mobile device 120 may connect with a ridehailing application server, which may be the ridehail application server(s) 170 as shown in FIG. 1. The ridehail application server(s) 170 may provide information to the mobile device and receive information from the mobile device as part of a ridehail platform. In some aspects, the ridehail passenger 140 may request a ridehail but not be able to positively identify the target vehicle 265 in a lineup of vehicles. This may be due to various reasons, such as a relatively similar design between all of the vehicles (as depicted in the scene), or a limited field of view of other identifying aspects that may otherwise be usable to differentiate the vehicles (such as a license plate number, vehicle color, driver description, photograph of a driver, etc.). In other examples, there may not be a driver associated with the ridehail if the vehicle(s) in the ridehail are AVs. Accordingly, the ridehail passenger 140 may not have a clear idea of the vehicle to which they have been matched, and in some cases, may not have an avenue for communication with a human driver to request identification assistance.

The VLC system 107 may solve these problems by providing real-time identification of a vehicle based in vehicle key information received via VLC signals emitted from the target vehicle. The mobile device 120 may be configured with an application 135 that receives information from the ridehail application server 170, and/or via direct communication with the target vehicle 265, where the application 135 identifies the target vehicle 265 among a plurality of vehicles in the scene, using an audible noise, a visual indication (e.g., light flashing from the target vehicle 265), and/or via an augmented reality representation that identifies the target vehicle 265 on a display of the mobile device 120.

For example, the ridehail passenger 140 may approach the scene by approaching the vehicles in the line, and establishing a line of sight with multiple vehicles in the line. The application 135 may include one or more instructions 260 that instruct steps for the ridehail passenger 140 to provide input data to the application 135 with which the mobile device processor 121 can process any VLC signals in the sequenced frames. The application 135 may utilize the VLC signals to authenticate the vehicle, and establish an encrypted communication channel between the target vehicle 265 and the mobile device 120. For example, the instructions 260 may read "SWEEP PHONE LEFT-TO-RIGHT" to prompt the ridehail passenger 140 to provide a series of video frames of the scene that capture the vehicles (and ideally, capture the target vehicle 265 in some or all of the frames). Accordingly, the ridehail passenger 140 may hold the mobile device up as depicted in FIG. 2, responsive to the instructions 260, and sweep the device from left to right such that a full view of the line of vehicles appears at least one time in the mobile device display 255. The mobile device 120 may save some or all of the image frames to a computer-readable memory onboard the mobile device 120 (not shown in FIG. 2), and perform image processing techniques as understood in the art of VLC communication.

The target vehicle 265 may include an onboard VLC system having a light emitting system 161 and in some selective embodiments, the HDR image camera system 163A. Stated another way, the vehicle 105 may be equipped to generate a beacon VLC signal similar to a beacon signal associated with a Bluetooth communication protocol, where any listening devices (or in the case of VLC communication, watching devices) such as the mobile device 120, may watch for the VLC signal and generate a vehicle ID request message 122 to request establishing the communication channel between the vehicle 105 and the mobile device 120.

In other aspects, the application 135 may further include one or more user-selectable action buttons 240, 245, 250 . . . etc. In the example of FIG. 2, the mobile device 120 may receive a user selection, and generate instructions for the vehicle 105 responsive to receiving the user selection. The mobile device 120 may send the instructions in one or more messages via the VLC channel 133B, responsive to a vehicle ID message that authenticates the target vehicle 265 with the application 135. The user selectable action buttons 240-250 may include options such as, for example, a button for "Flash Lamps" that may instruct the target vehicle 265 to flash vehicle headlamps (e.g., the headlamps 108 as depicted in FIG. 1) responsive to receiving a user selection of that button, "SOUND HORN", that instructs the target vehicle 265 to sound the horn (horn not shown in FIG. 2) responsive to receiving a user selection of that button, or perform any number of other possible identifying actions such as autonomous navigation to an approximate position of the calling mobile device 120.

Figure 3:
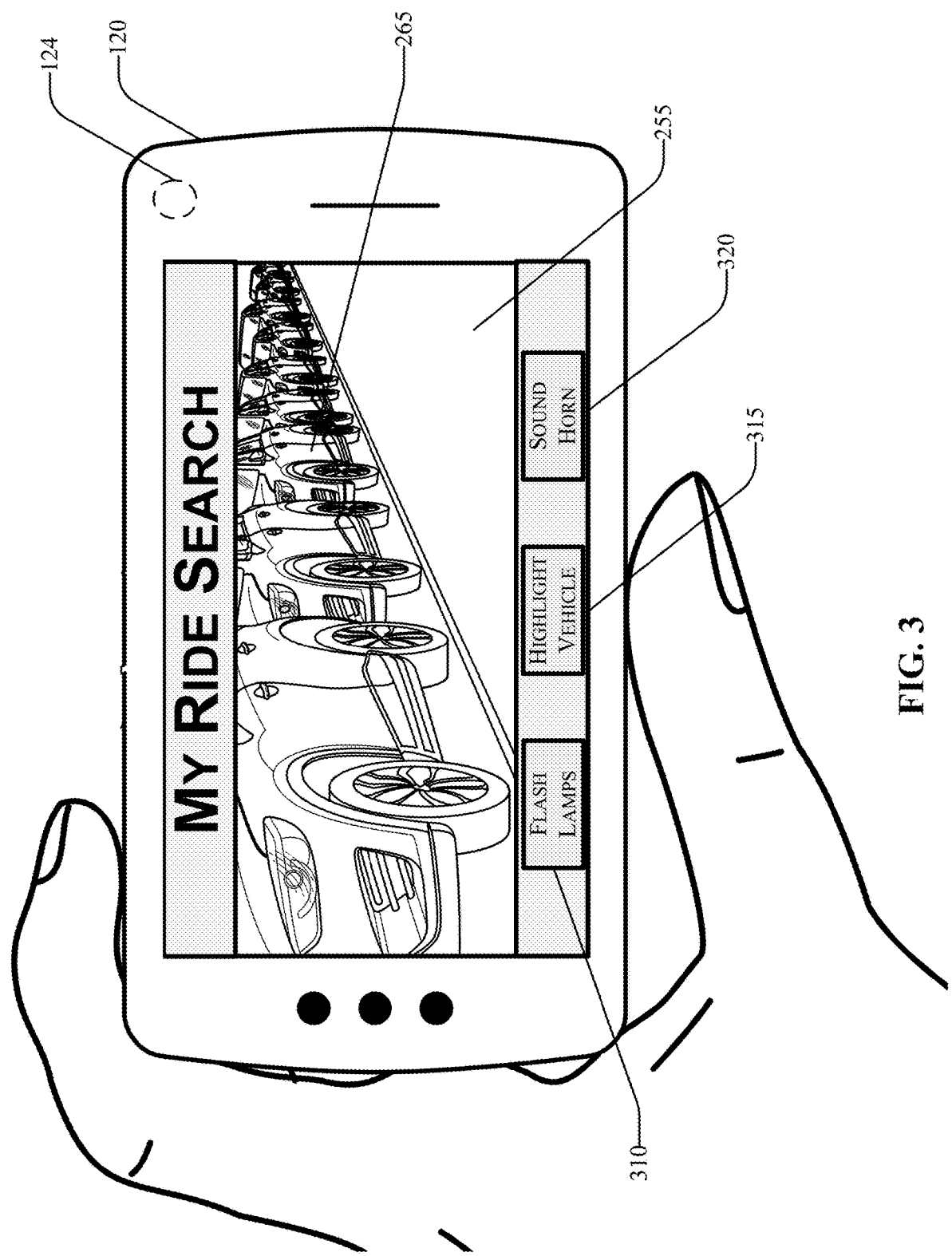

FIG. 3 depicts a street scene of a plurality of vehicles parked in a row, as viewed through the mobile device display 255. In one example scenario, the action buttons 240-250 indicate actions that are user selectable including a FLASH LAMPS action button 310, a HILIGHT VEHICLE action button 315, and a SOUND HORN action button 320. The mobile device 120 may display the real-time or substantially real-time scene (e.g., the scene 200 as shown in FIG. 2) on the mobile device display 255, after identifying the VLC signal emitted by the target vehicle 265 and establishing a VLC channel 133B with the vehicle 105 from the mobile device 120. The mobile device display 255 may also provide real-time confirmation of the authenticated vehicle. For example, responsive to selection of the highlight vehicle action button 315, the mobile device 120 may generate and send instructions that cause the target vehicle 265 to actuate vehicle interior cabin lights (if the time of the selection is during nighttime hours such that the scene is dark and the actuated interior cabin lights are noticeable from the vehicle exterior).

Figure 4:
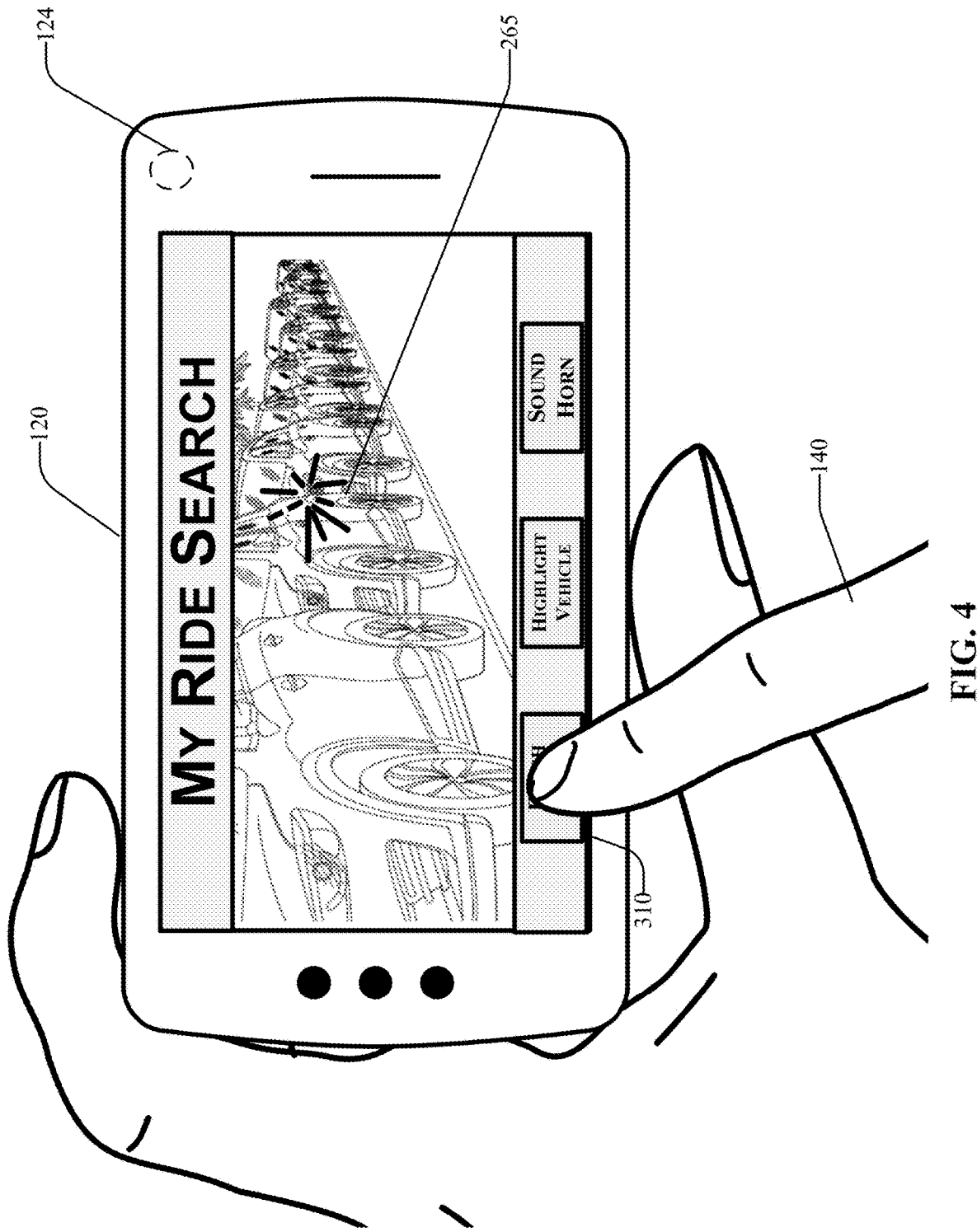

FIG. 4 shows another view of the street scene of the plurality of vehicles as viewed through the mobile device display 255. Here, the ridehail passenger 140 is depicted selecting the FLASH LAMPS action button 310. Responsive to receiving the user selection of the HILIGHT VEHICLE action button 315, the mobile device 120, and more particularly, the processor 121 (as shown in FIG. 1) may generate instructions that cause the vehicle to perform the requested action (in this example, flashing the vehicle headlamps), and send the instructions in an encrypted message to the target vehicle 265. The message may be sent via the VLC channel 133B as an encrypted packet. An example embodiment of establishing an encrypted channel using encryption key pairs is discussed hereafter with respect to FIG. 6. Responsive to receiving the action message from the mobile device 120, the VCU of the vehicle (e.g., the VCU 165 as depicted in FIG. 1) may execute the instructions using one or more control modules associated with the control instruction. For example, the BCM (e.g., the BCM 193 as shown in FIG. 1) may cause the vehicle horn to sound, or as depicted in FIG. 4, cause the vehicle headlamps 108 to flash according to the instructions in the message). By flashing the vehicle headlamps, the VLC system 107 may alert the ridehail passenger 140 as to the appropriate vehicle (the target vehicle 265) among all other vehicles in the vehicle line.

Figure 5:
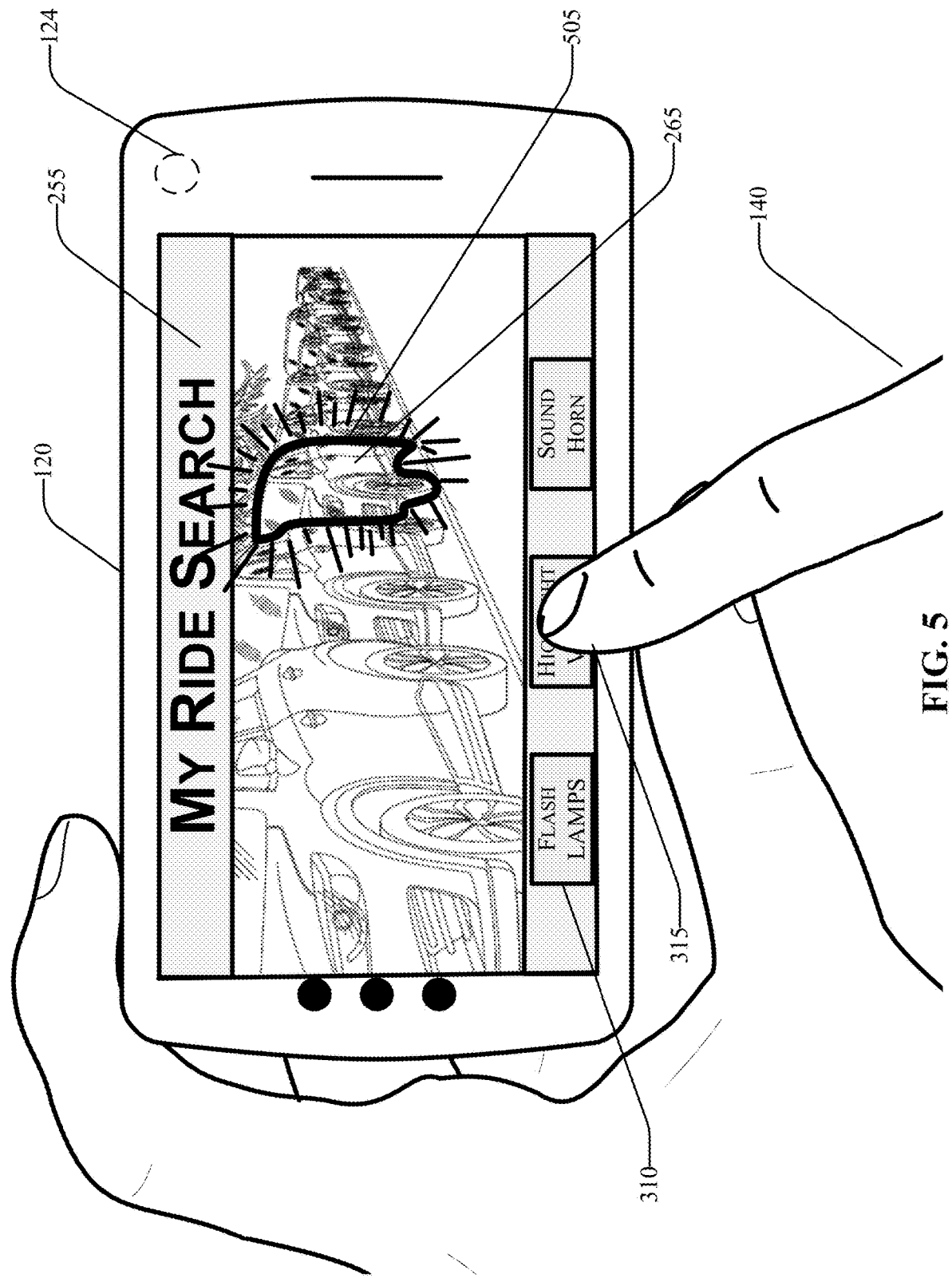

FIG. 5 shows another view of the street scene of the plurality of vehicles as viewed through the mobile device display 255. Here, the ridehail passenger 140 is depicted selecting the Highlight vehicle action button 315. Responsive to receiving the user selection of the HIGHLIGHT VEHICLE action button 315, the mobile device 120, and more particularly, the processor 121 (as shown in FIG. 1) may generate instructions that cause the mobile device to perform the requested action (in this example, generating an augmented reality overlay 505 of the frames showing the real-life street scene). For example, the overlay 505 may include a highlighted outline or other depiction of the real-time vehicle frame as obtained by the mobile device cameras 124. The augmented reality overlay 505 may be a highlighted spline, a line, an animation, a color overlay having the bounds of the target vehicle 265, or some other depiction that incorporates animated or computer-generated features with image frames showing the real-life scene and target vehicle 265. The mobile device 120 may send the message via the VLC channel 133B (depicted in FIG. 1) as an encrypted packet. An example embodiment of establishing an encrypted channel using encryption key pairs is discussed hereafter with respect to FIG. 6.

Responsive to receiving the action message from the mobile device 120, the VCU of the target vehicle 265 (which may be substantially similar to or identical to the VCU 165 as depicted in FIG. 1) may execute the instructions using one or more control modules associated with the control instruction. For example, the target vehicle 265 BCM may cause the vehicle horn (not shown in FIG. 5) to sound, or as depicted in FIG. 4, cause the vehicle headlamps 108 to flash according to the instructions in the message. By flashing the vehicle headlamps, the VLC system 107 may alert the ridehail passenger 140 as to the appropriate vehicle (the target vehicle 265) among all other vehicles in the vehicle line.

Figure 6:
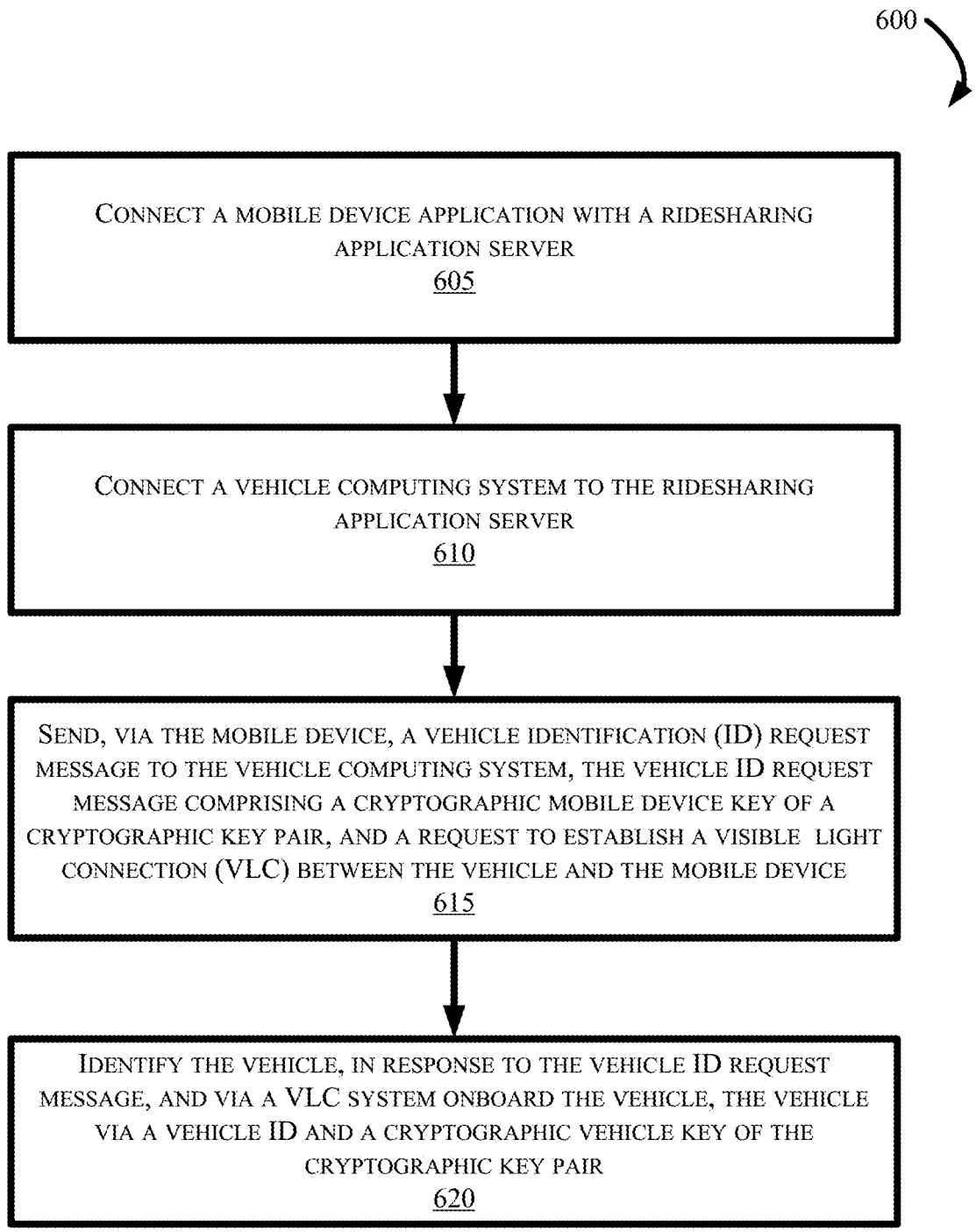
FIG. 6 is a flowchart of a flow diagram of an example method in accordance with the present disclosure.

FIG. 6 is a flow diagram of an example method 600 for generating a vehicle identification using a mobile device, such as the mobile device 120 as depicted in FIGS. 1-5. FIG. 6 may be described with continued reference to prior figures, including FIGS. 1-5. The following process is exemplary and not confined to the steps described hereafter. Moreover, alternative embodiments may include more or less steps that are shown or described herein, and may include these steps in a different order than the order described in the following example embodiments.

Referring first to FIG. 6, at step 605, the method 600 may commence with connecting a mobile device application with a ridehailing application server, such as, for example, the ridehail application server(s) 170 as shown in FIG. 1.

At step 610, the method may include connecting a vehicle computing system to the ridehailing application server. This step may include obtaining a cryptographically signed private key via the ridehailing application server, and determining that the cryptographic vehicle key is associated with a ridehailing account associated with the mobile device or the vehicle based on the private key and the cryptographic vehicle key.

At step 615, the method 600 may further include sending, via the mobile device 120, a vehicle identification (ID) request message to the vehicle computing system (e.g., the VCU 165). In one aspect, the vehicle ID request message may include a request to establish a VLC between the vehicle 105 and the mobile device 120. In one example embodiment, the vehicle ID request message can include a cryptographic mobile device key of a cryptographic key pair.

At step 620, the method includes identifying the vehicle via a VLC system onboard the vehicle, the vehicle via a vehicle ID and a cryptographic vehicle key of the cryptographic key pair.

In one embodiment, the method further includes determining, via the mobile device, that the cryptographic vehicle key is associated with a ridehailing account, and responsive to determining that the cryptographic vehicle key is associated with the ridehailing account, generating an augmented reality identifier that identifies the vehicle on a display of the mobile device 120. The receiving a video feed may include images of the vehicle within a line of sight of the mobile device 120. In one aspect, the method includes identifying, in the video feed, a light communication emission that includes the cryptographic vehicle key, and generating an augmented reality representation that identifies the vehicle on the display of the mobile device, the generating based on the light communication emission comprising the cryptographic vehicle key. The cryptographic vehicle key may be included in a VLC signal. Moreover, the VLC generated by the vehicle may generate the VLC signal using headlamps of the vehicle such that the headlamps cycle on and off at a rate inconceivable by a human observer, but readable using the HDR image camera system 163A onboard the mobile device 120. In other example embodiments, the light communication emission is generated using an interior cabin light of the target vehicle 265. For example, the interior cabin light may flicker at a similar rate so as to generate a signal that may be decrypted and to which a response can be generated by the mobile device 120. In another example embodiment, the VLC system 107 may provide an indication of a designated seat in the vehicle cabin, and/or may provide an AR indication of a particular door among a plurality of doors inside of the vehicle 105 through which the user is to enter the vehicle 105.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for generating a vehicle identification using a mobile device, comprising:
    connecting a mobile device application with a ridehailing application server;
    connecting a vehicle computing system associated with a vehicle to the ridehailing application server, wherein the vehicle is a ridehail vehicle assigned to a user associated with the mobile device application;
    sending, via the mobile device, a vehicle identification (ID) request message to a vehicle computing system, the vehicle ID request message to establish a visual light connection (VLC) between the vehicle and the mobile device;
    identifying the vehicle via a vehicle ID and a cryptographic vehicle key of a cryptographic key pair;
    determining that an intermittent or temporary obstruction exists between the vehicle and the mobile device;

sending, by the vehicle and based on the determination that the intermittent or temporary obstruction exists, the vehicle ID and the cryptographic vehicle key to a second vehicle; and identifying, by the mobile device, a light communication emission comprising the cryptographic vehicle key, wherein the light communication emission is generated using an interior cabin light of the second vehicle instead of the vehicle.

2. The method according to claim 1, wherein the vehicle ID request message comprises a cryptographic mobile device key of the cryptographic key pair.

3. The method according to claim 2, further comprising:
determining, via the mobile device, that the cryptographic vehicle key is associated with a ridehailing account; and
responsive to determining that the cryptographic vehicle key is associated with the ridehailing account, generating an augmented reality identifier that identifies the vehicle on a display of the mobile device.

4. The method according to claim 3, wherein generating the augmented reality identifier on the display of the mobile device comprises:
receiving a video feed comprising images of the vehicle within a line of sight of the mobile device;
identifying, in the video feed, the light communication emission comprising the cryptographic vehicle key;
displaying, by the mobile device, a user interface including an action button to cause an action at the vehicle;
receiving, by the mobile device, a user input indicative of a selection of the action button; and
generating, based on the user input to the user interface of the mobile device, an augmented reality representation that identifies the vehicle on the display of the mobile device, the generating based on the light communication emission comprising the cryptographic vehicle key.

5. The method according to claim 4, wherein the light communication emission is further generated using headlamps of the vehicle.

6. The method according to claim 4, wherein the augmented reality representation indicates a door of a plurality of doors inside the vehicle through which the user is to enter the vehicle.

7. The method according to claim 3, wherein the determining comprises:
obtaining a cryptographically signed private key via the ridehailing application server; and
determining that the cryptographic vehicle key is associated with a ridehailing account that is associated with the mobile device or the vehicle based on the cryptographically signed private key and the cryptographic vehicle key.

8. The method according to claim 1, further comprising:
sending a vehicle action request comprising instructions to perform one or more of sounding a horn signal or flashing a vehicle light.

9. A system, comprising:
a processor; and
a memory for storing executable instructions, the processor programmed to execute the instructions to:
connect a mobile device application with a ridehailing application server;
connect a vehicle computing system to the ridehailing application server;
send, via the mobile device, a vehicle identification (ID) request message to the vehicle computing system, the vehicle ID request message comprising a request to establish a visual light connection (VLC) between a vehicle and the mobile device;
identify the vehicle via a vehicle ID and a cryptographic vehicle key of a cryptographic key pair;
determine that an intermittent or temporary obstruction exists between the vehicle and the mobile device; and
identify a light communication emission comprising the cryptographic vehicle key, wherein the light communication emission is generated using an interior cabin light of the vehicle, and wherein the light communication is received from an infrared (IR) VLC source based on the determination that the intermittent or temporary obstruction exists.

10. The system according to claim 9, wherein the vehicle ID request message further comprises a cryptographic mobile device key of the cryptographic key pair.

11. The system according to claim 10, wherein the processor is further programmed to execute the instructions to:
determine, via the mobile device, that the cryptographic vehicle key is associated with a ridehailing account; and
responsive to determining that the cryptographic vehicle key is associated with the ridehailing account, generate an augmented reality identifier that identifies the vehicle on a display of the mobile device.

12. The system according to claim 11, wherein the processor is further programmed to execute the instructions to:
receive a video feed comprising images of the vehicle within a line of sight of the mobile device;
identify, in the video feed, the light communication emission comprising the cryptographic vehicle key;
display, by the mobile device, a user interface including an action button to cause an action at the vehicle;
receive, by the mobile device, a user input indicative of a selection of the action button; and
generate, based on the user input to the user interface of the mobile device, an augmented reality representation that identifies the vehicle on the display of the mobile device, the generating based on the light communication emission comprising the cryptographic vehicle key.

13. The system according to claim 12, wherein the processor is further programmed to execute the instructions to:
further identify the light communication transmission using light generated from headlamps of the vehicle.

14. The system according to claim 12, wherein the augmented reality representation indicates a door of a plurality of doors inside the vehicle through which the user is to enter the vehicle.

15. The system according to claim 9, wherein the processor is further programmed to execute the instructions to:
obtain a cryptographically signed private key via the ridehailing application server; and
determine that the cryptographic vehicle key is associated with a ridehailing account that is associated with the mobile device or the vehicle based on the cryptographically signed private key and the cryptographic vehicle key.

16. The system according to claim 9, wherein the processor is further programmed to execute the instructions to:
send a vehicle action request comprising instructions to perform one or more of sounding a horn signal or flashing a vehicle light.

17. A visual light communication (VLC) system comprising:
- a processor; and
- a memory for storing executable instructions, the processor programmed to execute the instructions to:
  - connect to a ridehailing application server;
  - receive, from a mobile device, a mobile device identification (ID) request message comprising a cryptographic mobile device key of a cryptographic key pair, wherein the request message includes a request to establish a visual light connection (VLC) between a vehicle and the mobile device;
  - generate, a VLC communication transmission comprising a vehicle ID and a cryptographic vehicle key of the cryptographic key pair, wherein the cryptographic vehicle key enables a VLC communication channel coupling the processor and the mobile device;
  - determine that an intermittent or temporary obstruction exists between the vehicle and the mobile device; and
  - identifying a light communication emission comprising the cryptographic vehicle key, wherein the light communication emission is generated using an interior cabin light of the vehicle, and wherein the light communication is received from an infrared (IR) VLC source based on the determination that the intermittent or temporary obstruction exists.

18. The VLC system according to claim 17, having further instructions stored thereupon to:
- determine that the cryptographic vehicle key is associated with a ridehailing account; and
- responsive to determining that the cryptographic vehicle key is associated with the ridehailing account, generate an augmented reality identifier that identifies the vehicle on a display of the mobile device.

19. The VLC system according to claim 17, having further instructions stored thereupon to:
- generate the light communication transmission further from a headlamp onboard the vehicle.

20. The VLC system according to claim 17, having further instructions stored thereupon to:
- receive a vehicle action request comprising instructions to perform one or more of sounding a horn signal or flashing a vehicle light; and
- sounding the horn signal or flashing the vehicle light responsive to receiving the instruction.

* * * * *